G. W. COX.
SCREW STOPPER FOR CANS, DRUMS, JARS, BOTTLES, AND OTHER VESSELS.
APPLICATION FILED NOV. 25, 1910.

1,031,775.  Patented July 9, 1912.

Witnesses.
C. J. Dulin
D. E. Burdull

Inventor.
George Wright Cox
by B. Singu
Attorney

UNITED STATES PATENT OFFICE.

GEORGE WRIGHT COX, OF LEICESTER, ENGLAND.

SCREW-STOPPER FOR CANS, DRUMS, JARS, BOTTLES, AND OTHER VESSELS.

1,031,775.     Specification of Letters Patent.     Patented July 9, 1912.

Application filed November 25, 1910. Serial No. 594,062.

*To all whom it may concern:*

Be it known that I, GEORGE WRIGHT COX, a subject of the King of Great Britain, and a resident of Leicester, England, (whose post-office address is Waterloo House, Uppingham Road, Leicester, England,) bread salesman, have invented an Improved Screw-Stopper for Cans, Drums, Jars, Bottles, and other Vessels, of which the following is a specification.

My invention relates to improvements in stoppers or caps intended to be screwed into or over the apertures of cans or like vessels, and the object of my improvement is, to provide quick and ready means for gaining leverage in screwing or unscrewing such stoppers or caps without resort to a separate instrument. I attain this object by means of an extensible lever or arm attached to the stopper and normally resting within or against it.

Some forms of my invention are shown in the accompanying drawings, in which—

Figure 1:
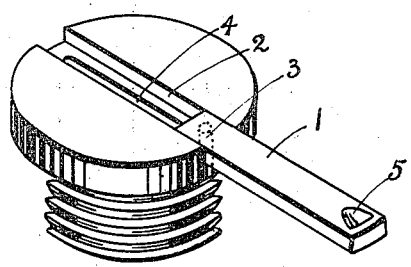
Figure 2:
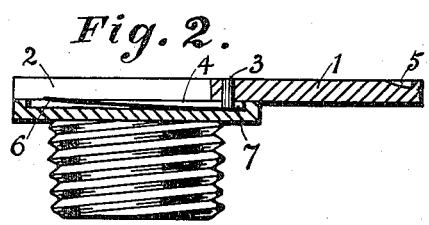
Figure 3:
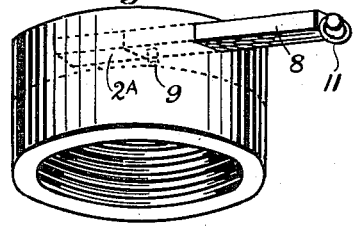
Figure 4:
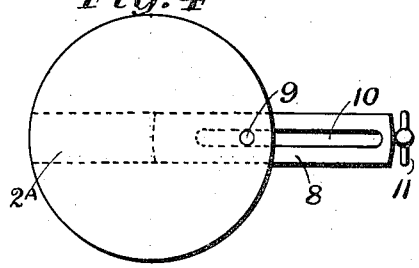
Figure 5:
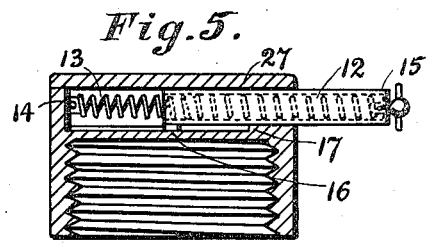
Figure 6:
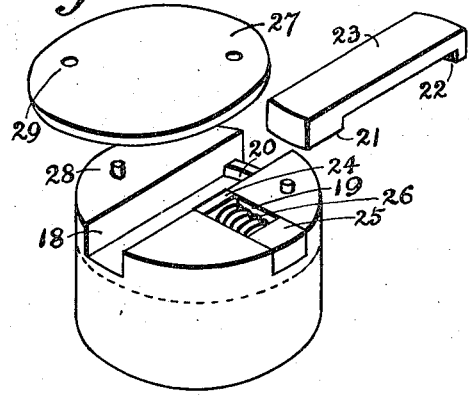

Figure 1 is a perspective view of one form of my invention; Fig. 2 a sectional elevation of the same; Fig. 3 a perspective view of a similar form; Fig. 4 a plan of the same; Fig. 5 a sectional elevation of a similar form; Fig. 6 a perspective view of a similar form, showing separate parts.

The form shown in Figs. 1 and 2 comprises a screw stopper having a straight bolt or lever 1 sliding in a transverse slot 2 in its head, and normally lying evenly therein. The bolt is prevented from rising in the slot by the undercut form of the latter, while it is limited in its range by a pin 3 projecting from near its inner end into a secondary slot or trough 4, within the main slot, the closed ends of which engage with the pin when in its two extreme positions. The drawing out of the bolt 1 is facilitated by a nick 5 and to prevent its too free action a spring 6 within the trough is arranged to press upward against the bolt 1 when the bolt is nearly home.

Figs. 3 and 4 show a modification comprising a screw cap, in the solid upper part of which is a bolt run 2ᵃ adapted to receive the bolt 8, the range of which is also limited by a stop pin 9, but in this case, the pin, instead of being fixed in the bolt, is driven through the top of the cap over the bolt run and the bolt itself has a slot 10 in which the pin engages and limits its range. A ring 11 hung on the outer end of the bolt facilitates its withdrawal. A spring (not shown) may be inserted in the slot, if desired, between the pin and either end of the slot, for the purpose of pushing or pulling the bolt home after being drawn out.

Fig. 5 shows an arrangement similar to that in Figs. 3 and 4. In this form the bolt 12 is tubular and a returning spring 13 is placed within it connected at one end with the closed end 14 of the bolt run and at the other end with the closed or outer end 15 of the tubular bolt. The outward range of the latter is limited by a stud 16 on the outside of the tube which meets the abutment 17 within the bolt run. The cap plate 27 may be detachable so as to facilitate the placing of the bolt and spring.

In the form shown in Fig. 6, a slot 18 is cut across the top of the screw cap and another 19 at right angles to it, which need only extend half across the cap. A stop or stud 20 is fixed within or across the slot 18 near one end to form an abutment for the projections 21 and 22 under the ends of the bolt 23 and thus limit the play of the latter. The depth of the bolt at its ends is very slightly less than that of the slot or run, while its central part is shaped so as to clear the stop 20. Within the short slot 19 is placed a loose plate 24 and at the outer end of the same slot a block 25 is fixed. Between these is set a compressed spring 26. This arrangement is intended to provide a restraining pressure on the bolt to prevent its too free action. When the bolt is set in position in its run the cap plate 27 is brought down upon it and secured by the rivets 28, which fit into the holes 29 of the cap plate.

I claim:

In a screw stopper or cap for cans and like vessels, the combination of a solid head having an open channel therein with overhanging sides, a bolt-like arm adapted to fit and slide therein and restrained from upward movement by said overhanging sides, said bolt being of the same shape and approximately of the same size as the channel so as to fit therein and not project endwise therefrom when in an inoperative position and adapted to be slid outward for the greater part of its length to provide leverage in turning the said stopper or cap.

In testimony whereof I affix my signature in the presence of two witnesses.

GEORGE WRIGHT COX.

Witnesses:
 JACOB STANLEY,
 CLAUDE A. HADLEY.